(12) United States Patent
Chiu

(10) Patent No.: US 6,639,146 B1
(45) Date of Patent: Oct. 28, 2003

(54) EMI PROTECTIVE CABLE CONNECTOR

(75) Inventor: Teh-Tsung Chiu, Taipei Hsien (TW)

(73) Assignee: AVC Industrial Corp., Taipei Hsien (TW)

( * ) Notice: Subject to any disclaimer, the term of this patent is extended or adjusted under 35 U.S.C. 154(b) by 0 days.

(21) Appl. No.: 10/185,347

(22) Filed: Jun. 26, 2002

(51) Int. Cl.$^7$ .............................. H05K 9/00; H02G 3/18
(52) U.S. Cl. ................. 174/35 R; 174/35 C; 174/65 R; 439/98; 439/610
(58) Field of Search .............................. 174/35 R, 35 C, 174/65 R, 65 SS, 65 G, 75 C, 74 R, 88 C, 102 R; 439/578, 583, 584, 95, 96, 271, 607, 98, 609, 610

(56) References Cited

U.S. PATENT DOCUMENTS

| | | | | |
|---|---|---|---|---|
| 4,547,623 A | * | 10/1985 | Van Brunt et al. | 174/35 R |
| 4,896,000 A | * | 1/1990 | Procter et al. | 174/74 R |
| 5,371,819 A | * | 12/1994 | Szegda | 385/75 |
| 5,410,102 A | * | 4/1995 | Guiol et al. | 174/35 C |
| 6,376,766 B1 | * | 4/2002 | Bartholoma et al. | 174/35 C |

* cited by examiner

Primary Examiner—Dean A. Reichard
Assistant Examiner—Carmelo Oliva
(74) Attorney, Agent, or Firm—Pro-Techtor International Services

(57) ABSTRACT

An EMI protective cable connector is constructed to include a metal casing fastened to a metal box by a gasket ring and a lock nut to hold a cable, a flexible packing barrel and a plastic clamping ring mounted in one end of the metal casing, a packing nut fastened to one end of the metal casing to compress the plastic clamping ring and the flexible packing barrel against the outer insulator of the cable, and a metal conducting plate stopped between a step inside the metal casing and one end of the flexible packing barrel and adapted for transmitting electromagnetic waves from the cable to the metal casing and then the metal box, the metal conducting plate having inwardly radially extended springy retaining arms each having a free end terminating in a curved contact portion disposed in contact with the tube of electrically conducting material of the cable, the curved contact portions of the springy retaining arms being alternatively curved in reversed directions.

2 Claims, 8 Drawing Sheets

EMI PROTECTIVE CABLE CONNECTOR

BACKGROUND OF THE INVENTION

1. Field of the Invention

The present invention relates to a cable connector for fastening a cable to a metal box and, more particularly, to such a cable connector, which effectively eliminates electromagnetic interference.

2. Description of the Related Art

When arranging electronic lines, transmission lines 71 are surrounded by an inner insulator 72 inside a tube of electrically conducting material 73 held in place by an outer insulator 70 (see FIG. 1A). Metal box and cable connector means are commonly used to connect cables of the aforesaid design. In order to eliminate electromagnetic interference and noises, a conducting member 600 is used (see FIG. 1B) is used with the cable connector. The conducting member 600 comprises a plurality of outwardly protruded stop portions 6003 formed of a part of the peripheral wall by stamping, a plurality of retaining arms 6001 respectively obliquely extended from the top end thereof toward the cable 70. The retaining arms 6001 each have a free end terminating in a curved contact portion 6002 disposed in contact with the tube of electrically conducting material 73 of the cable 70. During installation, the conducting member 600 is inserted into one end of the metal casing 100 of the cable connector, a flexible packing barrel 300 and a clamping ring 300 are inserted into the other end of the metal casing 100 (see FIG. 1), and then a packing nut 400 is threaded onto the metal casing 100 to compress the clamping ring 300 against the flexible packing barrel 300 and the cable 70. Further, a gasket ring 500 is fastened to the metal casing 100 to seal the gap between the metal casing 100 and the metal box (not shown) in which the cable connector is installed. This design of cable connector is still not satisfactory in function. The drawback of this design of cable connector is outlined hereinafter.

1. The conducting member 600 is complicated and expensive to manufacture, and the bulky design of the conducting member 600 requires much installation space. When in use, no means is provided to hold down the connection between the conducting member 600 and the metal casing 100, and a false contact between the conducting member 600 and the metal casing 100 results in poor EMI (electromagnetic interference) protection.
2. When pulling the cable 70 out of the connector for a replacement, the protruded stop portions 6003 and/or the retaining arms 6001 may be forced to break.

SUMMARY OF THE INVENTION

The present invention has been accomplished to provide an EMI protective cable connector, which eliminates the aforesaid problems. It is the main object of the present invention to provide an EMI protective cable connector, which effectively eliminates electromagnetic interference. It is another object of the present invention to provide an EMI protective cable connector, which is durable in use. According to one aspect of the present invention, the EMI protective cable connector comprises a metal casing fastened to a metal box by a gasket ring and a lock nut to hold a cable, a flexible packing barrel and a plastic clamping ring mounted in one end of the metal casing, a packing nut fastened to one end of the metal casing to compress the plastic clamping ring and the flexible packing barrel against the outer insulator of the cable, and a metal conducting plate stopped between a step inside the metal casing and one end of the flexible packing barrel and adapted for transmitting electromagnetic waves from the cable to the metal casing and then the metal box. The metal conducting plate comprises inwardly radially extended springy retaining arms, each springy retaining arm having a free end terminating in a curved contact portion disposed in contact with the tube of electrically conducting material of the cable. According to another aspect of the present invention, the curved contact portions of the springy retaining arms of the metal conducting plate are alternatively curved in reversed directions.

DETAILED DESCRIPTION OF THE PREFERRED EMBODIMENT

Figure 1:
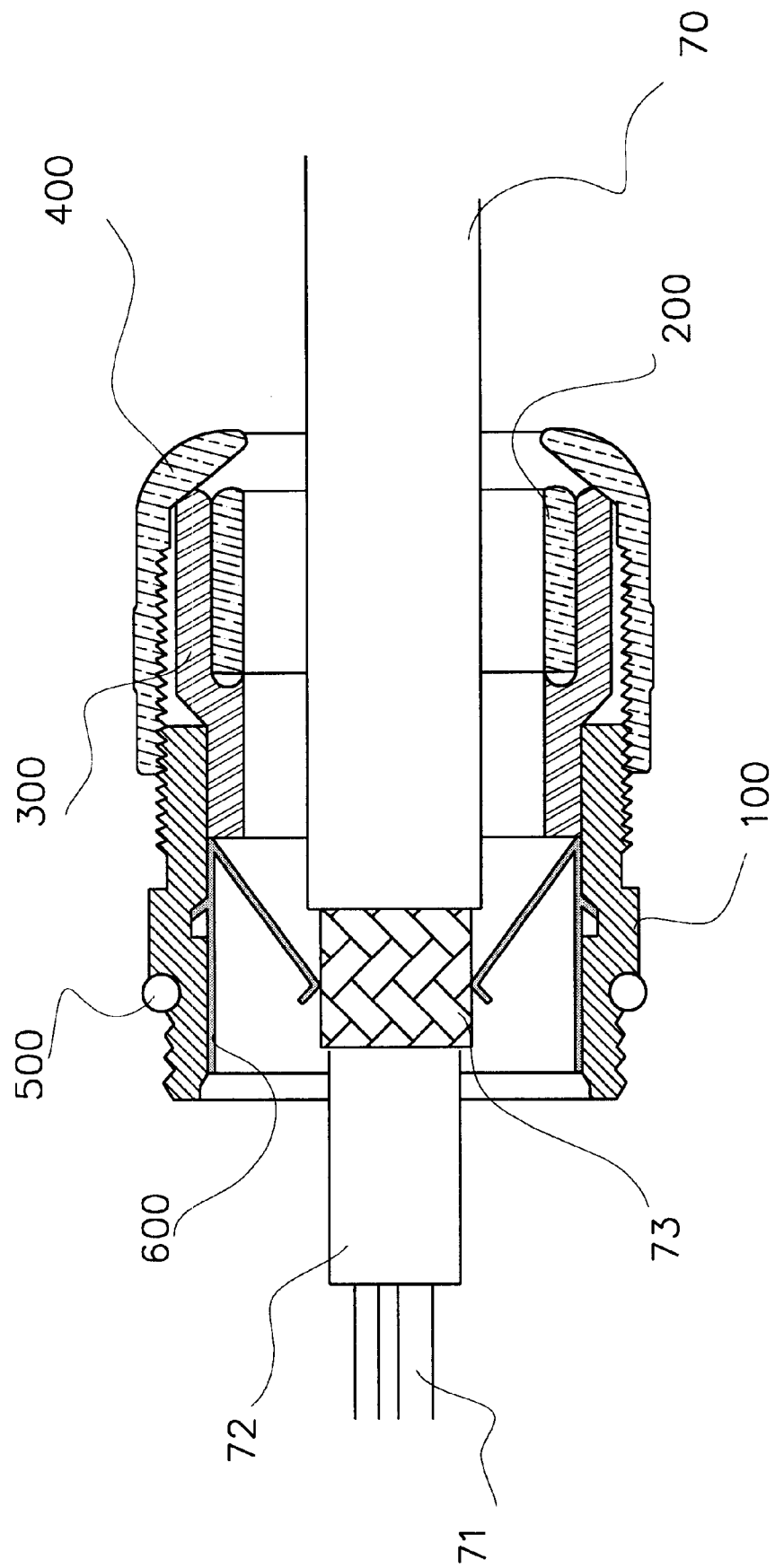
FIG. 1 is a schematic drawing showing the structure of a cable connector according to the prior art.
Figure 1A:
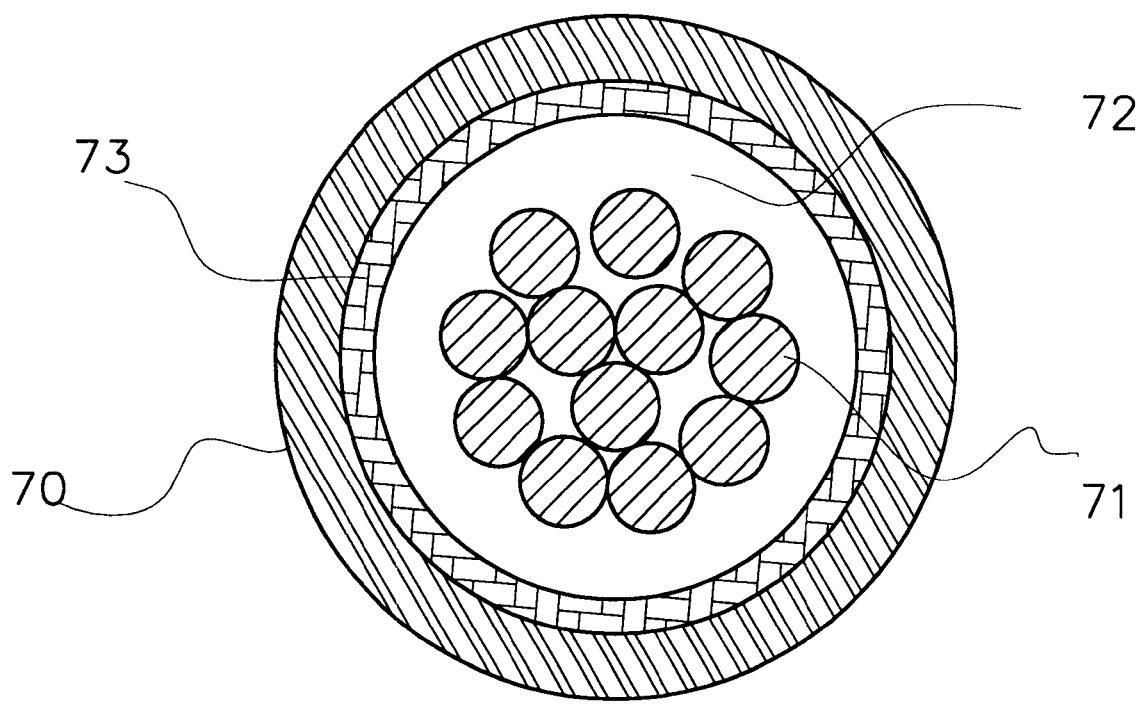
FIG. 1A is a sectional view of the cable connector according to the prior art.
Figure 1B:
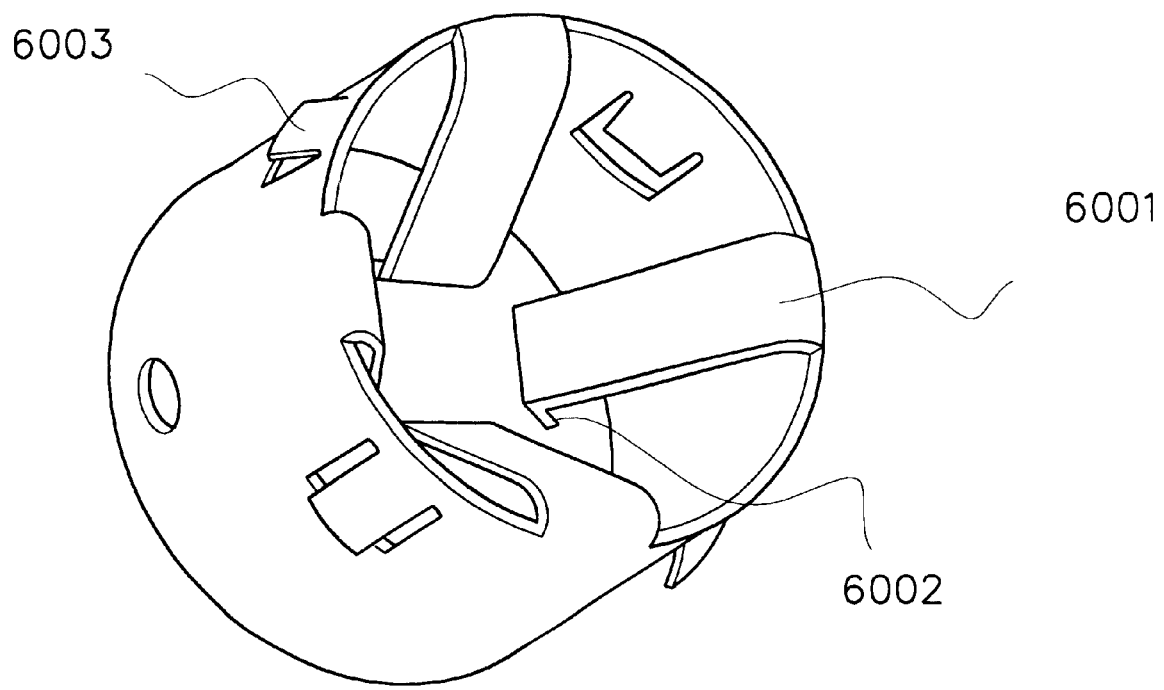
FIG. 1B is an enlarged view of a part of the prior art cable connector.
Figure 2:
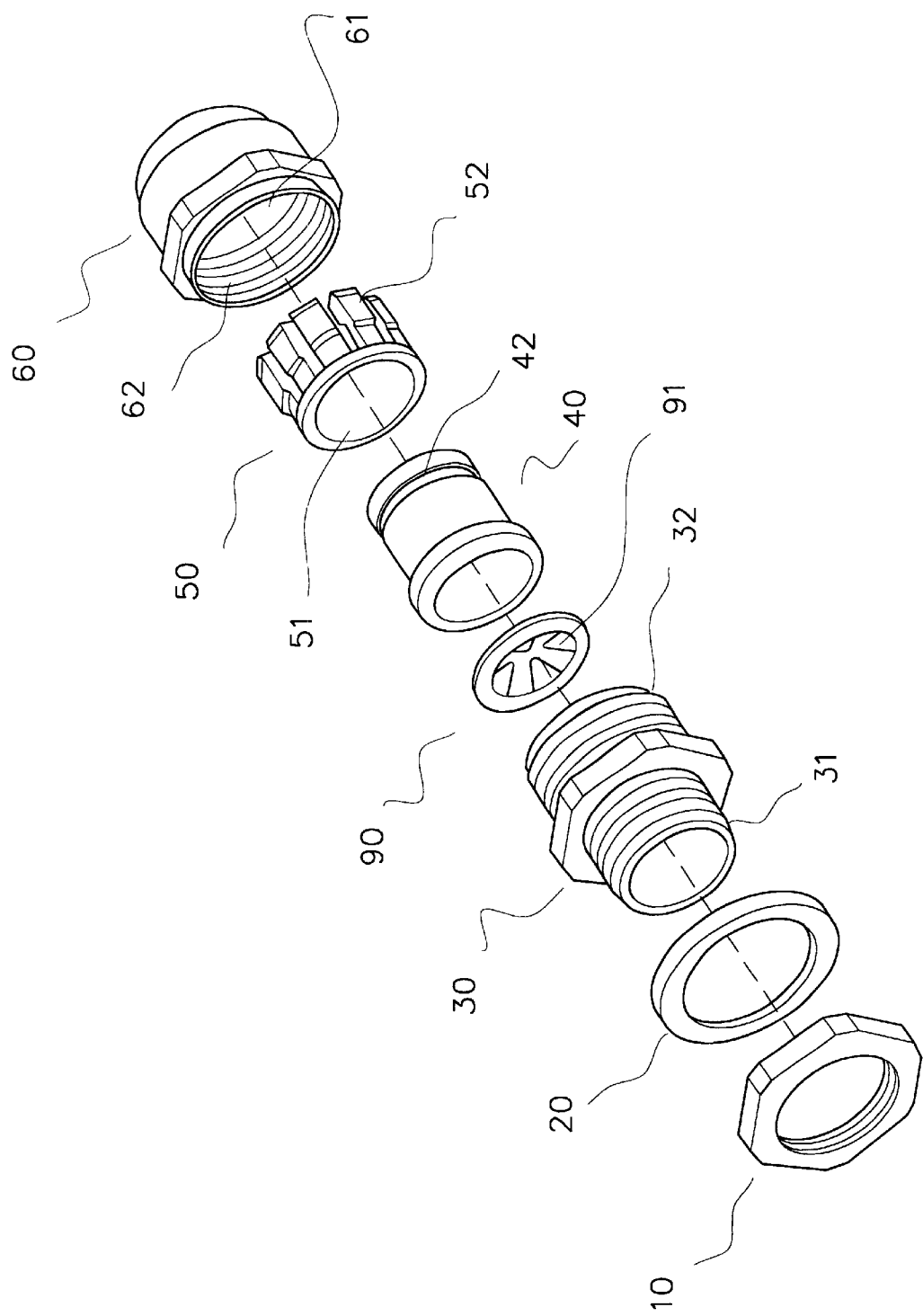
FIG. 2 is an exploded view of an EMI protective cable connector according to the present invention.
Figure 3A:
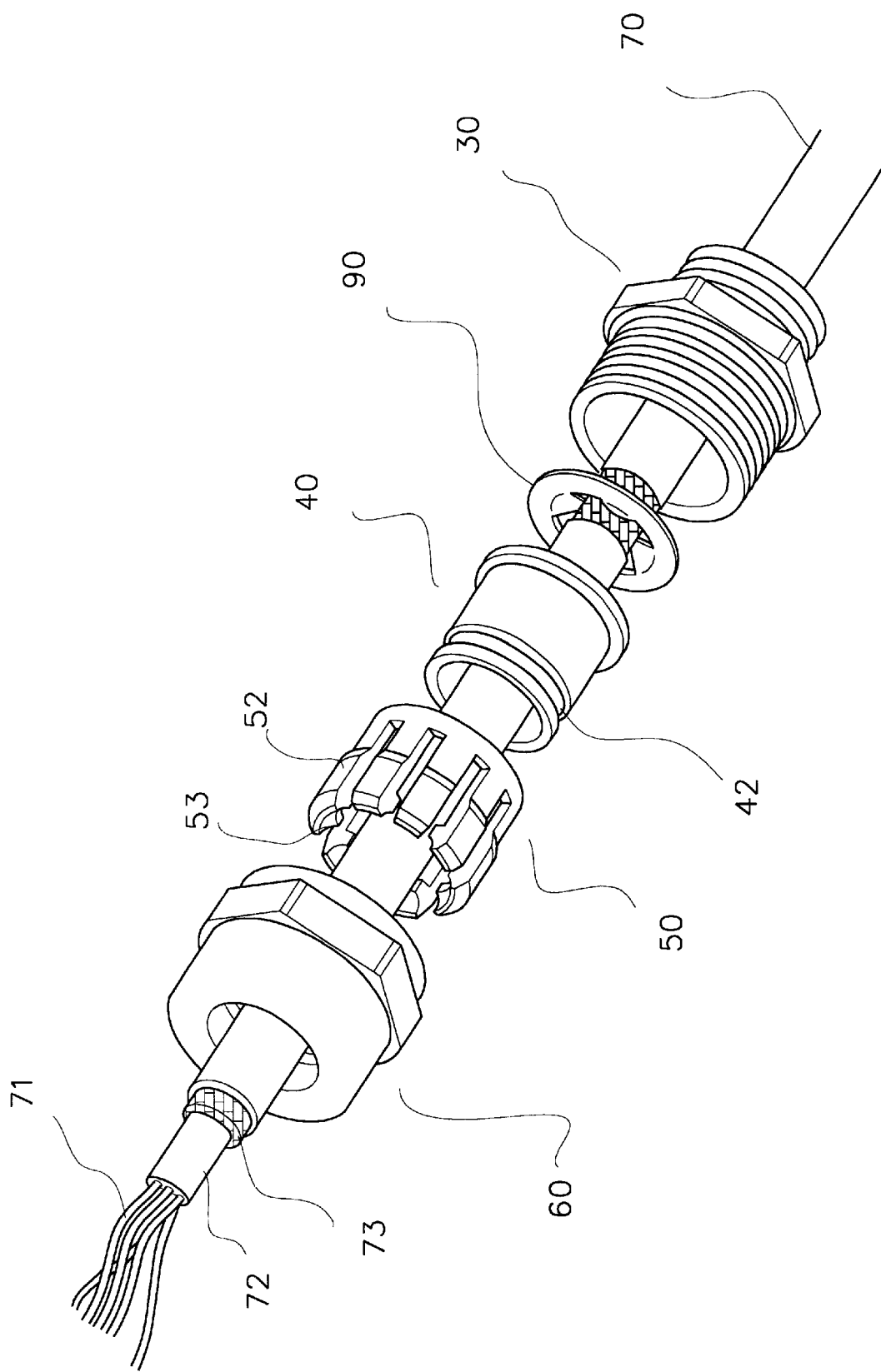
FIG. 3A is a schematic assembly view of the EMI protective cable connector according to the present invention (I).

Referring to FIGS. 2 and 3A, a cable connector is shown comprised of a metal lock nut 10, a gasket ring 20, a metal casing 30, a packing barrel 40, a plastic clamping ring 50, a metal packing nut 60, and a metal conducting plate 90.

Figure 2A:
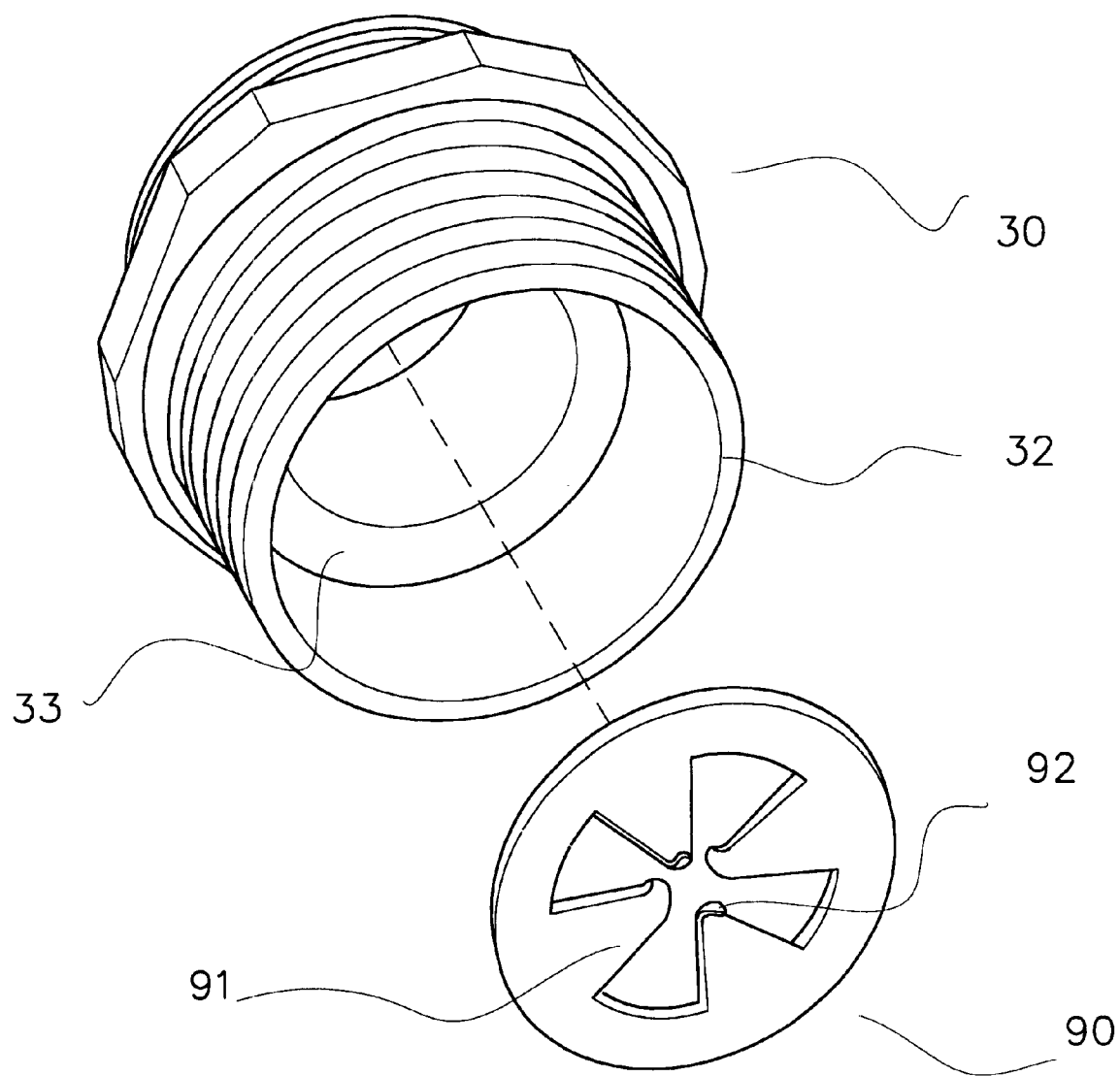
FIG. 2A is an enlarged view of a part of the present invention.
Figure 3B:
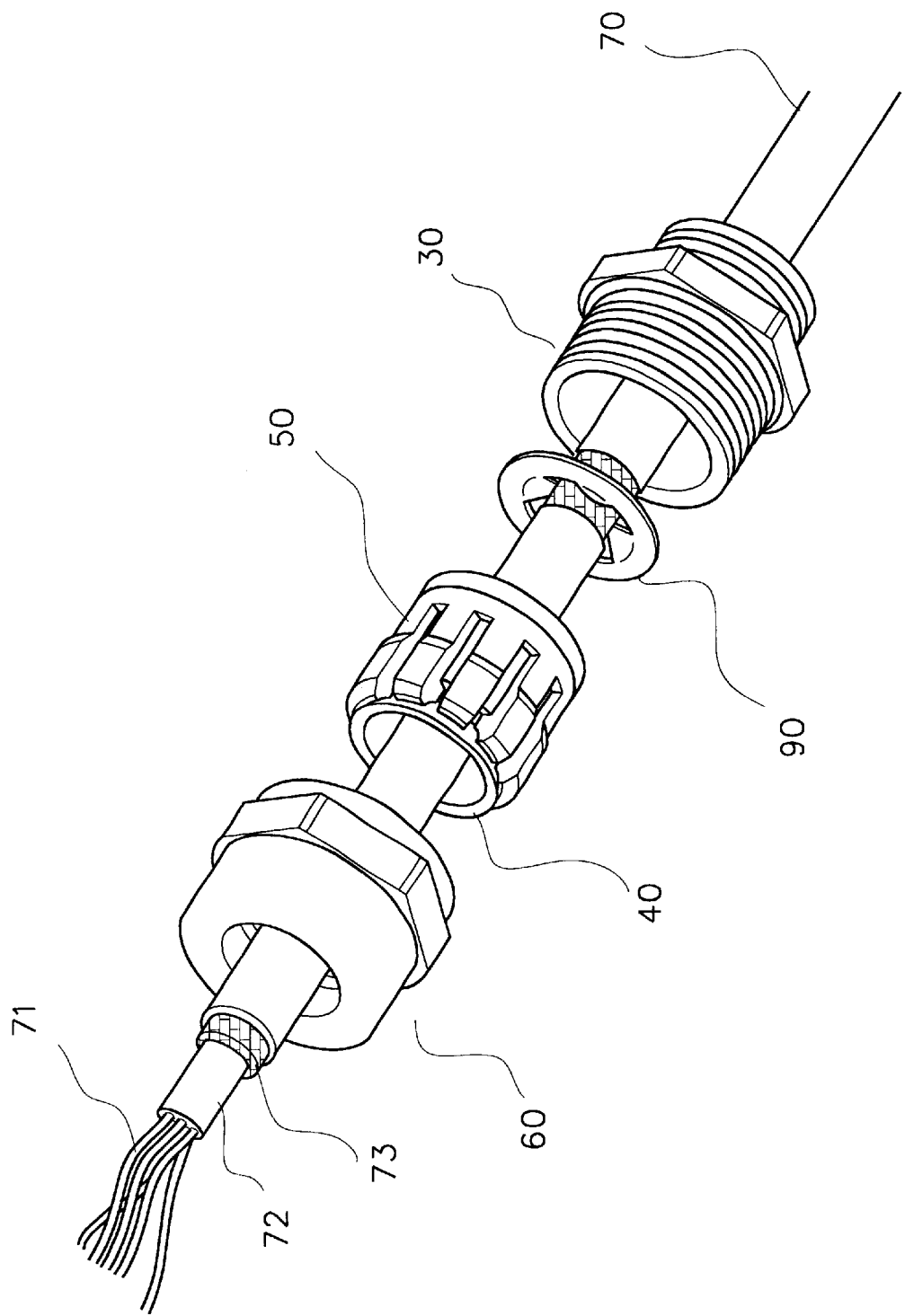
FIG. 3B is a schematic assembly view of the EMI protective cable connector according to the present invention (II).

The lock nut 10 is a ring-shaped nut made of metal. The gasket ring 20 is molded from plastic material. The metal casing 30 is a hollow cylindrical member having a first outer thread 31 and a second outer thread 32 extended around the periphery thereof at two sides. The first outer thread 31 of the metal casing 30 is inserted through a hole in a metal box 80, and then the lock nut 10 is threaded onto the first outer thread 31 to fix the metal casing 30 to the metal box 80, keeping the second outer thread 32 disposed outside the metal box 80 (see FIG. 4) for the mounting of the metal packing nut 60. The metal casing 30 further comprises an inside annular step 33 (see FIG. 2A) adapted for stopping the metal conducting plate 90 inside the metal casing 30. The packing barrel 40 is a flexible tubular member having an outside annular groove 42 extended around the periphery near one end. The plastic clamping ring 50 is molded from plastics, having a center through hole 51 and a plurality of clamping strips 52 equiangularly spaced around the center through hole 51 and respectively terminating in an inwardly protruded hooked portion 53 adapted for engaging the outside annular groove 42 of the packing barrel 40 (see FIG. 3B). The metal packing nut 60 comprises an inner thread 62 and a tapered inside guide face 61 axially aligned on the inside. The metal conducting plate 90 is obtained from a flat metal plate by stamping, comprising a plurality of inwardly radially protruded springy retaining arms 91. The retaining arms 91 each have a free end terminating in a curved contact portion 92. The curved contact portions 92 of the retaining arms 91 are alternatively curved in reversed directions (see FIG. 2A).

The installation of the EMI protective cable connector is simple and outlined hereinafter. At first, the plastic clamping ring 50 is sleeved onto the packing barrel 40 to force the hooked portions 53 of the clamping strips 52 into engagement with the outside annular groove 42 of the packing barrel 40, and then the metal conducting plate 90 is inserted into the inside of the metal casing 30 and stopped at the inside annular step 33, and then the packing barrel 40 is inserted with the plastic clamping ring 50 into the inside of the casing 30 and stopped against the metal conducting plate 90 around the cable 70, and then the packing nut 60 is threaded onto the second outer thread 32 of the metal casing 30 to force the tapered inside guide face 61 against the clamping strips 52 of the plastic clamping ring 50 at the packing barrel 40, causing the packing barrel 40 to hold down the cable 70 and the curved contact portions 92 of the springy retaining arms 91 of the metal conducting plate 90 to retain the tube of electrically conducting material 73 of the cable 70, and then the gasket ring 20 is sleeved onto the first outer thread 31 inside the metal box 80, and then the lock nut 10 is threaded onto the first outer thread 31 of the metal casing 30 to secure to the cable 70 and the EMI protective cable connector to the metal box 80 (see FIG. 4).

As indicated above, when fastened up the packing nut 60, the plastic clamping ring 50 and the packing barrel 40 are forced radially inwards to hold down the cable 79 and to force the metal conducting plate 90 against the inside annular step 33 of the metal casing 30, keeping the curved contact portion 92 in close contact with the tube of electrically conducting material 73 of the cable 70 for transmitting electromagnetic waves from the tube of electrically conducting material 73 of the cable 70 to the metal box 80. Because the metal conducting plate 90 is a flat member, it does not occupy much installation space. Further, because the curved contact portions 92 of the retaining arms 91 are alternatively curved in reversed directions, pulling the cable 70 forwards or backwards does not break the curved contact portions 92 or the retaining arms 91.

Figure 4:
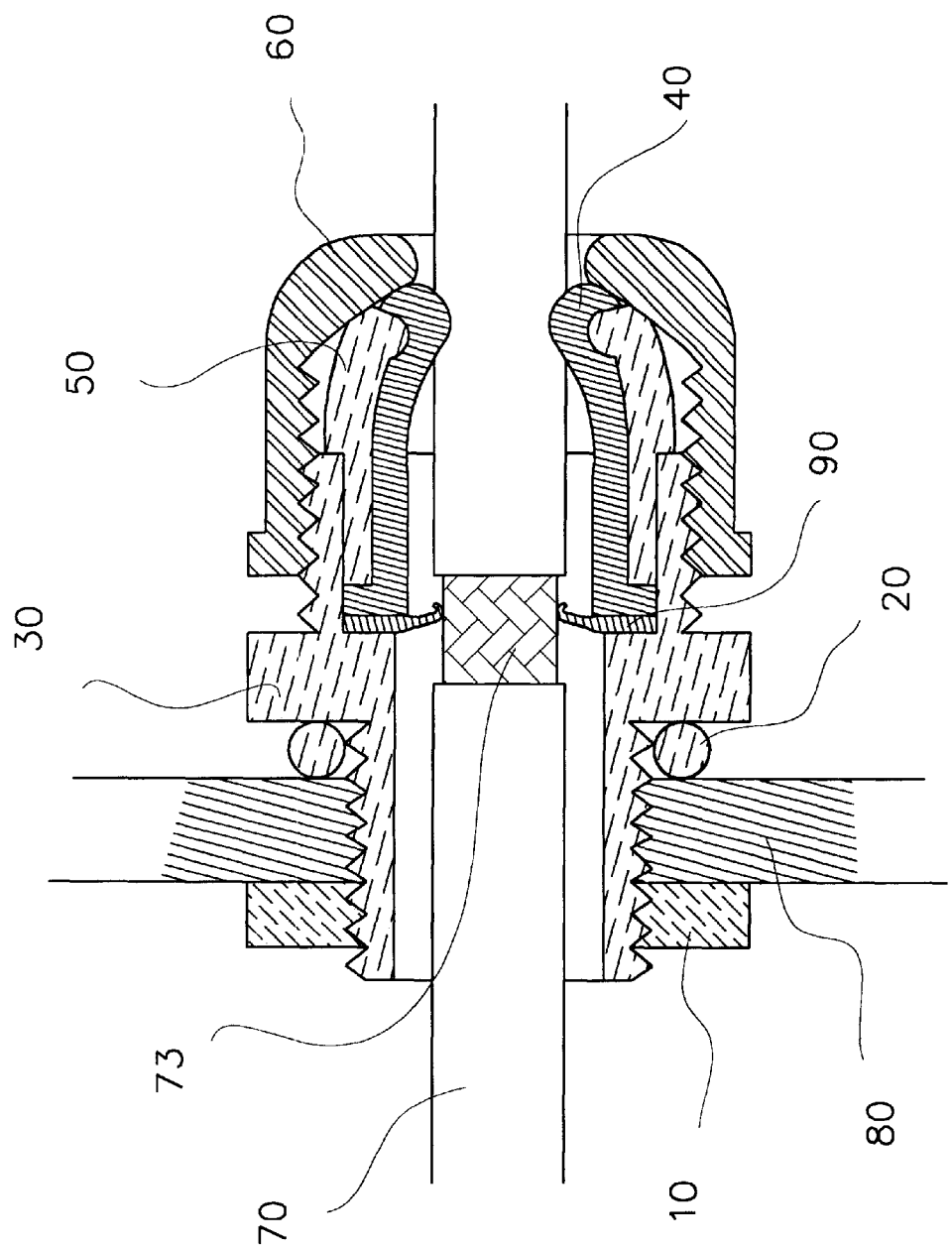
FIG. 4 is a sectional view of the EMI protective cable connector.

A prototype of EMI protective cable connector has been constructed with the features of FIGS. 2~4. The EMI protective cable connector functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An EMI protective cable connector comprising a metal casing sleeved onto a cable, which consists of a tube of electrically conducting material surrounding a number of transmission lines held in place by an outer insulator, and mounted in a hole in a metal box, said metal casing having a first outer thread disposed at one end thereof inside said metal box and a second outer thread disposed at an opposite end thereof outside said metal box, a flexible packing barrel sleeved onto said cable and partially received in said metal casing, a plastic clamping ring sleeved onto said flexible packing barrel and partially received in said metal casing, a metal packing nut threaded onto the second outer thread of said metal casing to compress said plastic clamping ring against said flexible packing barrel and the outer insulator of said cable, a gasket ring mounted on the first outer thread of said metal casing inside said metal box, and a lock nut threaded onto the first outer thread of said metal casing to fix said metal casing to said metal box, wherein a metal conducting plate is mounted in said metal casing and stopped between a step inside said metal casing and one end of said flexible packing barrel and disposed in contact with the tube of electrically insulating material of said cable for transmitting electromagnetic waves from said cable to said metal casing and then said metal box, said metal conducting plate comprising a plurality of springy retaining arms radially inwardly extended from the periphery thereof toward said cable, said springy retaining arms each having a free end terminating in a curved contact portion disposed in contact with the tube of electrically conducting material of said cable.

2. The EMI protective cable connector as claimed in claim 1, wherein the curved contact portions of said springy retaining arms of said metal conducting plate are alternatively curved in reversed directions.

* * * * *